(No Model.) 2 Sheets—Sheet 1.
L. H. NUTTING.
ELECTRICALLY CONTROLLED WEIGHING APPARATUS.
No. 544,745. Patented Aug. 20, 1895.
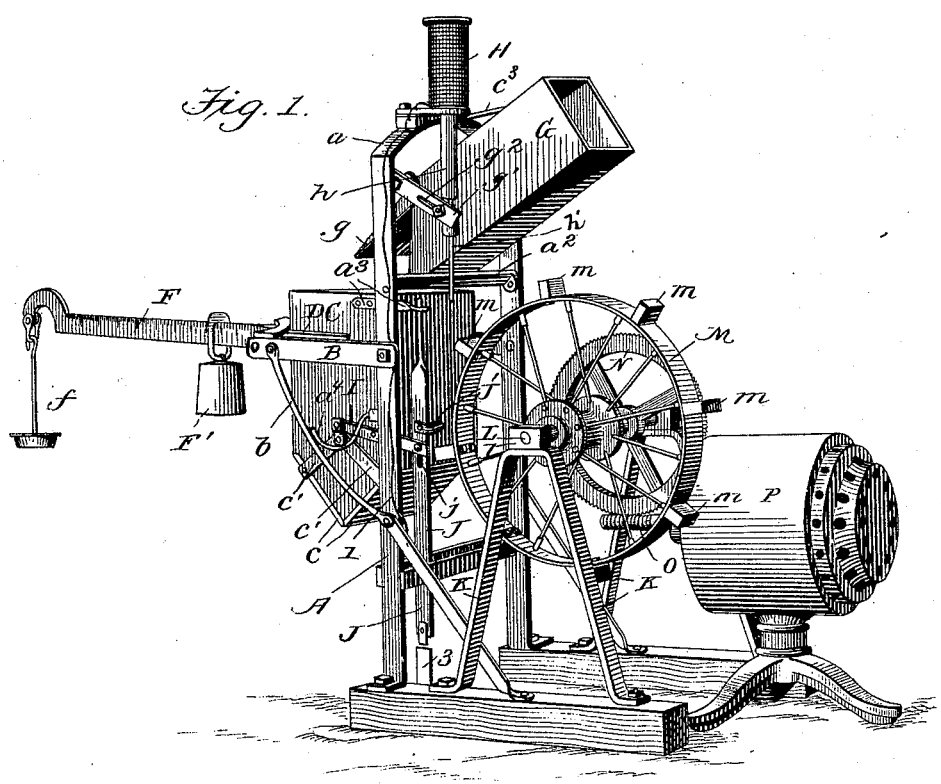
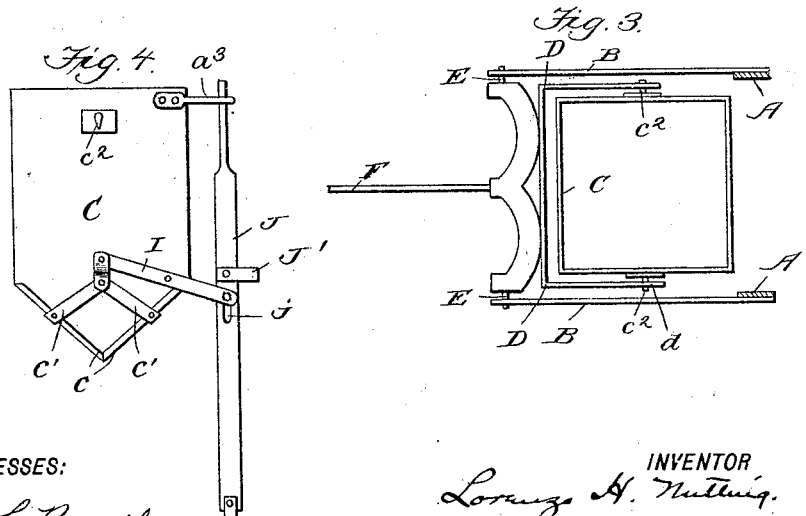
WITNESSES:
Edwin L. Bradford
A. E. Hall
INVENTOR
Lorenzo H. Nutting.
BY
John Wedderburn
his ATTORNEY.

(No Model.) 2 Sheets—Sheet 2.

L. H. NUTTING.
ELECTRICALLY CONTROLLED WEIGHING APPARATUS.

No. 544,745. Patented Aug. 20, 1895.

WITNESSES:
Edwin L. Bradford
A. E. Hall

INVENTOR
Lorenzo H. Nutting
BY
John Wedderburn
his ATTORNEY.

UNITED STATES PATENT OFFICE.

LORENZO HOWARD NUTTING, OF DAVENPORT, IOWA.

ELECTRICALLY-CONTROLLED WEIGHING APPARATUS.

SPECIFICATION forming part of Letters Patent No. 544,745, dated August 20, 1895.

Application filed November 13, 1894. Serial No. 528,622. (No model.)

*To all whom it may concern:*

Be it known that I, LORENZO HOWARD NUTTING, a citizen of the United States, residing at Davenport, in the county of Scott and State of Iowa, have invented certain new and useful Improvements in Electrically-Controlled Weighing Apparatus; and I do hereby declare the following to be a full, clear, and exact description of the invention, such as will enable others skilled in the art to which it appertains to make and use the same.

My invention relates to electrically-controlled weighing apparatus especially designed for the weighing automatically of substances to be put in packages of certain sizes—such as tea, coffee, spices, and the like—and adapted to weigh such substances accurately from one ounce up to any required weight.

The invention consists in the construction, arrangement, and combination of parts, as will be fully hereinafter set forth in the specification and defined in the appended claims.

I have illustrated the invention in the accompanying drawings, which form a part of this specification, and in which—

Figure 2:
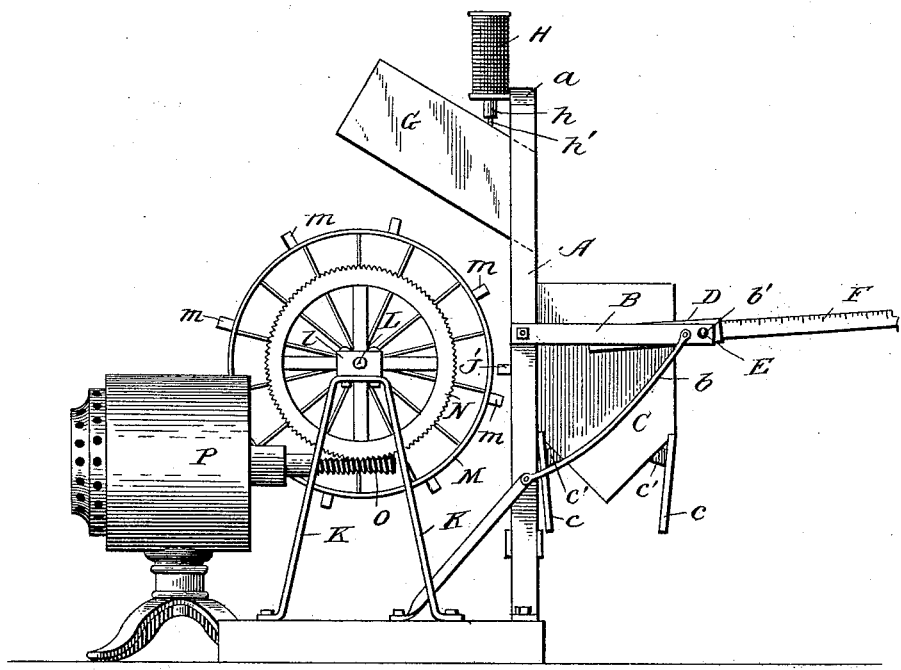
Figure 5:
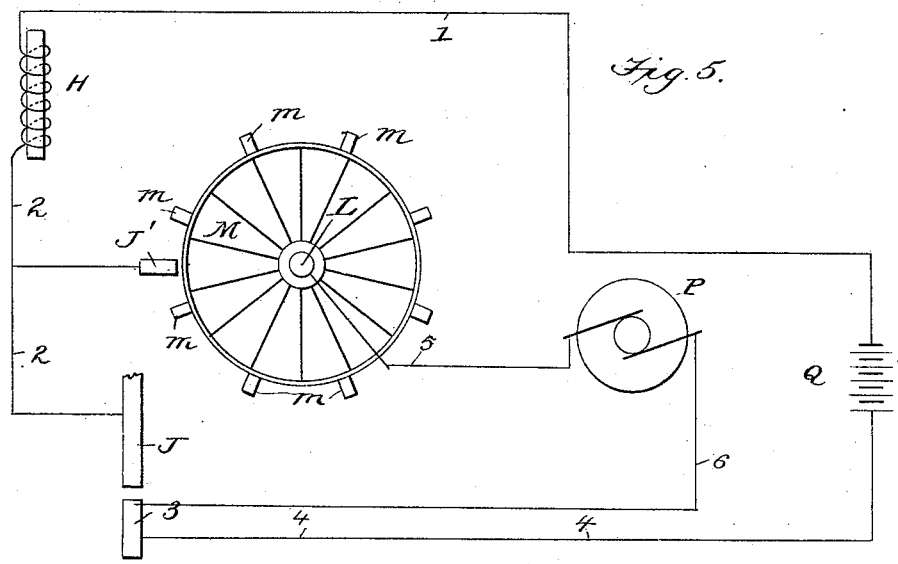

Figure 1 represents a perspective view of the device, looking slightly from the rear and showing the scale in the position for weighing. Fig. 2 is a side elevation of the same, looking from the other side and showing the hopper in its dumping position. Fig. 3 is a plan view of the hopper, showing its connections with its support. Fig. 4 is a detail side view of the hopper, showing its attachments thereto; and Fig. 5 is a view representing diagrammatically the circuits.

Referring to the drawings by letter, A represents the supporting framework of the machine, consisting of two upright standards made of iron joined at the top by a cross-head $a$, preferably made integral therewith and securely fastened to a suitable base or support, of wood or other insulating material, by bolts or otherwise. At intervals between the sides of the frame A the same may be braced by cross-bars. Slightly above the middle of the said frame are secured horizontal extensions or beams B B, provided with suitable brace-rods $b\ b$, by which the same are held rigidly, and formed at their outer ends with bearings $b'\ b'$, as clearly shown in the drawings. The hopper C is disposed between the same.

This hopper is made substantially square in cross-section with an open top and is provided with doors or gates $c\ c$, hinged thereto near the bottom. These doors or gates fit the angularly-shaped ends of the sides of the hopper and are adapted to be opened and closed by means of the pivoted levers $c'\ c'$ and other operating mechanism, to be described later. The hopper C is further provided with projecting pins $c^2\ c^2$, which fit slots $d\ d$ of a yoke D, upon which the hopper is supported. This yoke is provided with a horizontally-disposed knife-edged rod E, which fits into the bearings $b'\ b'$ of the beams B B.

F represents the scale-lever, of ordinary construction, secured to the yoke D, extending outwardly therefrom and provided with a weight-holder $f$ at its extreme outer end, whereby the said hopper and lever are balanced upon their trunnion-support.

F' is a movable weight-adjuster, whereby the amount of material to be weighed in the hopper is regulated.

Secured to the frame A above the hopper C is the feeding chute or spout G. As shown in the drawings, this is angularly disposed, its lower end leading into the top of the hopper and bolted to a cross-bar $a^2$, and its upper end being fastened to the cross-head $a$ by the strip $c^3$. This chute G is provided with a gate $g$ at its lower end, hinged along its upper edge and adapted to open upwardly. One end of the shaft to which the door is hinged and secured is provided with a lever $g'$, having an elongated slot $g^2$ therein, by means of which lever the said door is opened and closed.

H represents a solenoid or other electromagnetic device of ordinary construction, secured to the cross-head $a$ of the frame A in any suitable manner. The core $h$ of the solenoid reciprocates vertically therein and has an extension $h'$ thereon, provided in turn with a projecting pin, which passes through the slot $g^2$ of the lever $g'$. It will thus be seen that the upward or downward movement of the core $h$ will close or open the door $g$ of the chute.

I is a lever fulcrumed at or near its center to hopper C, pivotally connected at one end to the levers $c'\ c'$ and having a pin at its other end which fits and moves in a slot $j$ of a vertically-disposed rod or shaft J, whose upper portion moves in a guide $a^3$, secured to the hopper C. It will be seen that the upward or downward movement of the rod J will open or close the doors c c of the hopper. The doors are kept normally closed by means of the spring $a^4$, connected at one end to the hopper C, its free end passing beneath the pivot of the levers $c'$ $c'$. The rod J is further provided with a projecting lug $J'$, for a purpose which will appear presently.

K K represent a pair of oppositely-disposed metallic supports secured to the insulated base by proper means, having a horizontal shaft L connecting the same and journaled in bearings $l$ in the top thereof. This shaft L has keyed thereon a metallic wheel M, which is provided at intervals along its periphery with lugs $m$ $m$, which are adapted to engage the lug $J'$ of the rod J during the revolution of the said wheel, and which also form circuit-terminals or contact-points; also keyed to the said shaft L is a gear wheel or pinion N, having peripheral threads cut therein, which are engaged by the threads upon the main driving-shaft O of the electric motor P.

Q represents an electric battery or generator of any suitable construction, having circuit-wires leading therefrom as follows: The wire 1 passes from the dynamo along the frame A to the solenoid H, the wire 2 leading from said solenoid to the rod J, which constitutes a circuit-terminal, the circuit being completed through the contact-point 3 and wire 4 to dynamo. The motor P is in a shunt-circuit leading from the rod J through one of the contact-points $m$, wheel M, shaft L, metallic support K, wire 5 to motor, and by wire 6 and contact-point 3 back to dynamo, thereby completing the circuit.

My invention has now been sufficiently described, it is thought, to enable its operation to be readily understood. Starting, then, with the device in the position in which it is shown in Fig. 1, with the doors c c of the hopper C closed, the door $g$ of the chute G open, the weight-adjuster F' set for the weight it is desired to measure or weigh—say, for example, eight ounces—and with the electric current open between the rod J and the contact-point 3, the operation is as follows: The material to be weighed is fed from a source of supply to the chute G, whence it passes into the hopper C. When the required weight—eight ounces—has been fed into the hopper, the balance is overcome, and the said hopper drops as far as it is permitted to, carrying with it the rod J. The latter upon reaching the contact-point 3 closes the circuit through the solenoid H, and the lug $J'$ makes contact with the lug $m$ on the wheel M and closes the shunt-circuit through the motor. The solenoid H, being thus energized, attracts and draws in its core $h$, and through the lever $g'$ and its connections closes the door $g$ of the chute G. At the same time the motor-shaft O is actuated, and through gear-wheel N and shaft L the wheel M is caused to rotate in the direction of the hands of a watch. The lug $m$ on said wheel engaging the lug $J'$ elevates the rod J and breaks the electrical contact at the point 3 and throws the entire current through the motor. The elevation of the rod J through the levers I and $c'$ $c'$ opens the doors c c of the hopper C, and the requisite amount—eight ounces—of the substance is dropped out in any proper receptacle. The wheel M continues its rotation until the lugs $J'$ and $m$ pass out of engagement, which will take place during a partial rotation. When this takes place, the circuit is broken and both the solenoid and motor become de-energized. This permits a dropping of the rod J by gravity, which closes the door of the hopper, a dropping of the core $h$ of the solenoid, which opens the door $g$ of the chute, and a cessation of rotation of the wheel M. The device is now in its original position and ready for a continuance of the operation, the hopper C having fallen back into its balanced position as soon as the charge therein was emptied when the doors c c were opened.

It will be seen that I have devised a machine that is adapted for weighing accurately materials from a very small weight to a very large weight—something which scales of the ordinary construction are unable to perform. The machine is very effectual in actual operation and can be made at a moderate cost. I have shown and described the same in the form preferred at the present time; but it is obvious that many minor changes may be made therein without departing from the nature or spirit of the invention or sacrificing any of its advantages. All such obvious changes are clearly within the scope of the invention and are intended to be embraced thereby.

Having now described my invention, what I claim as new, and desire to secure by Letters Patent, is—

1. In a weighing apparatus, the combination of a balanced hopper adapted to receive the material to be weighed having angularly disposed outlet doors therein, a pair of pivoted levers connected respectively at their free ends to said doors and connected at their pivot point with a lever fulcrumed in said hopper and having its outer end engaging a rod, a chute located above said hopper having a pivoted outlet gate and a crank for opening and closing said gate, and electrically controlled mechanism for elevating said rod to open the doors of the hopper and for turning said crank to alternately close and open the gate of the feed chute, substantially as and for the purpose set forth.

2. In a weighing apparatus, the combination with a hopper having outlet doors therein and a feed chute for said hopper having an outlet gate therein, of electrically-controlled mechanism for alternately opening and closing the doors of the hopper and the gate of the chute, the same consisting of a solenoid or electro-magnet, for operating the gate of the chute, an electric motor, a rod for operating the doors of the hopper and also for closing the circuit through said solenoid and said motor, and connections between said motor and said rod whereby the latter is elevated to open the doors of the hopper and afterward break the electric circuit, substantially as and for the purpose described.

3. In combination the hopper C having angularly disposed doors c c connected by the pivoted levers c' c', lever I, rod J having lug J', chute G having gate g and slotted lever g', solenoid H having core h and extension h', motor P, having main shaft O engaging pinion or gear wheel N on shaft L, wheel M on said shaft provided with lugs m thereon, and electrical connections from a source of electrical supply between the solenoid H, rod J, wheel M and motor P, substantially as and for the purpose described.

In testimony whereof I have signed this specification in the presence of two subscribing witnesses.

LORENZO HOWARD NUTTING.

Witnesses:
WILL M. T. WEISE,
FRANK H. WEISE.